Figure 1:
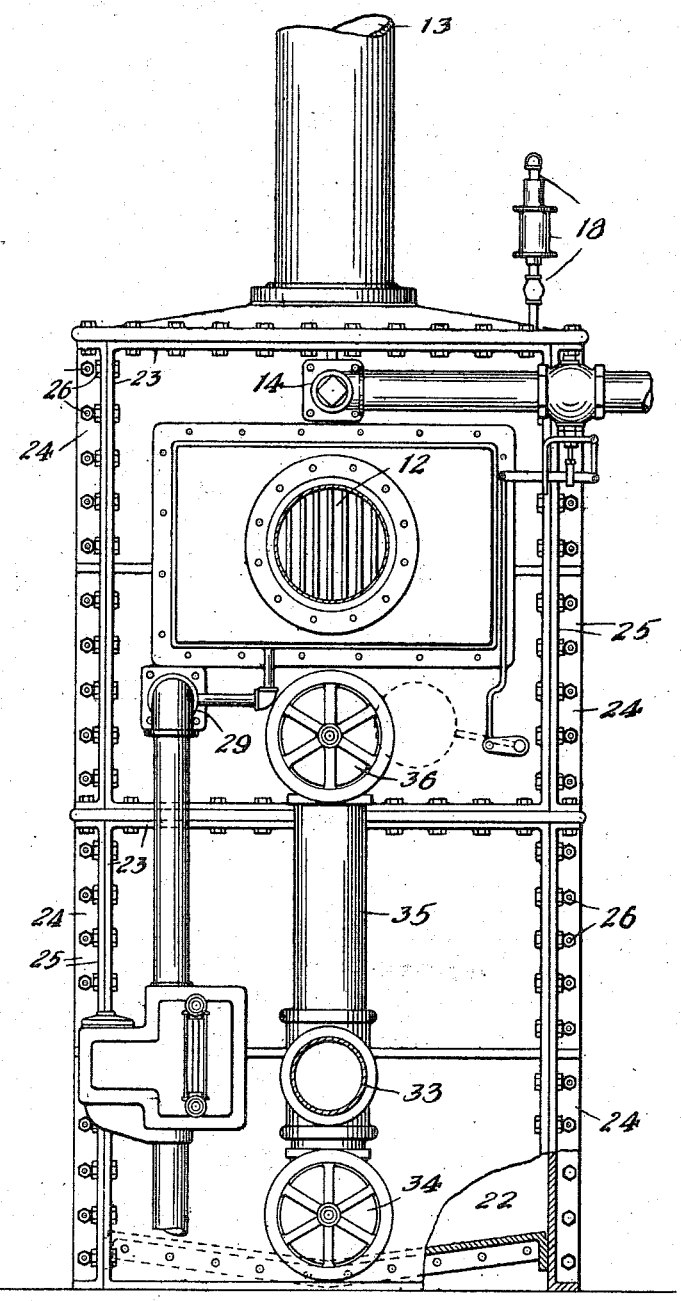

T. J. COOKSON.
FEED WATER HEATER AND PURIFIER.
APPLICATION FILED DEC. 19, 1908.

972,824.

Patented Oct. 18, 1910.
3 SHEETS—SHEET 1.

Witnesses:
Wm. Geiger

Inventor:
Thomas J. Cookson
By Munday, Evarts, Adcock & Clarke
Attorneys

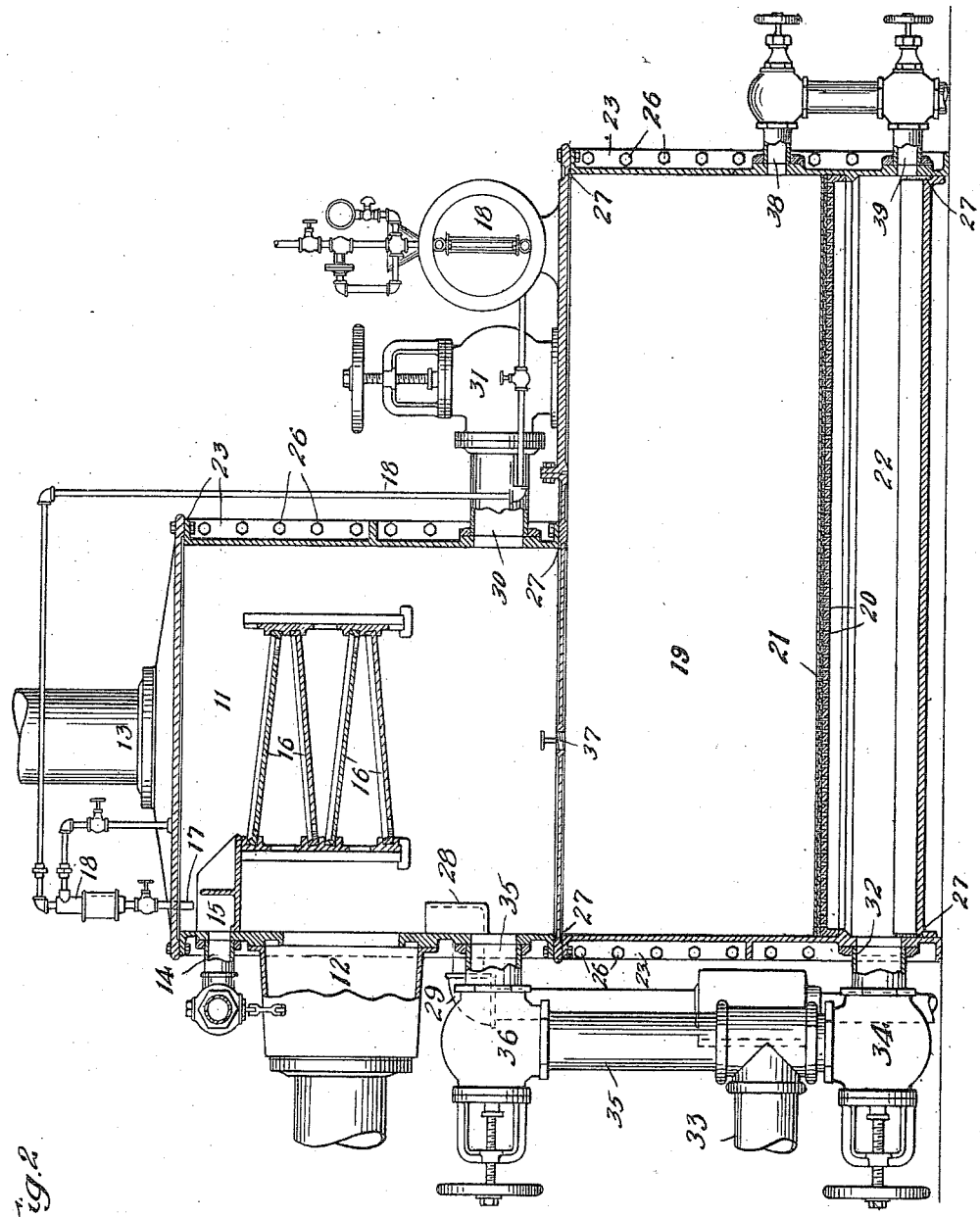

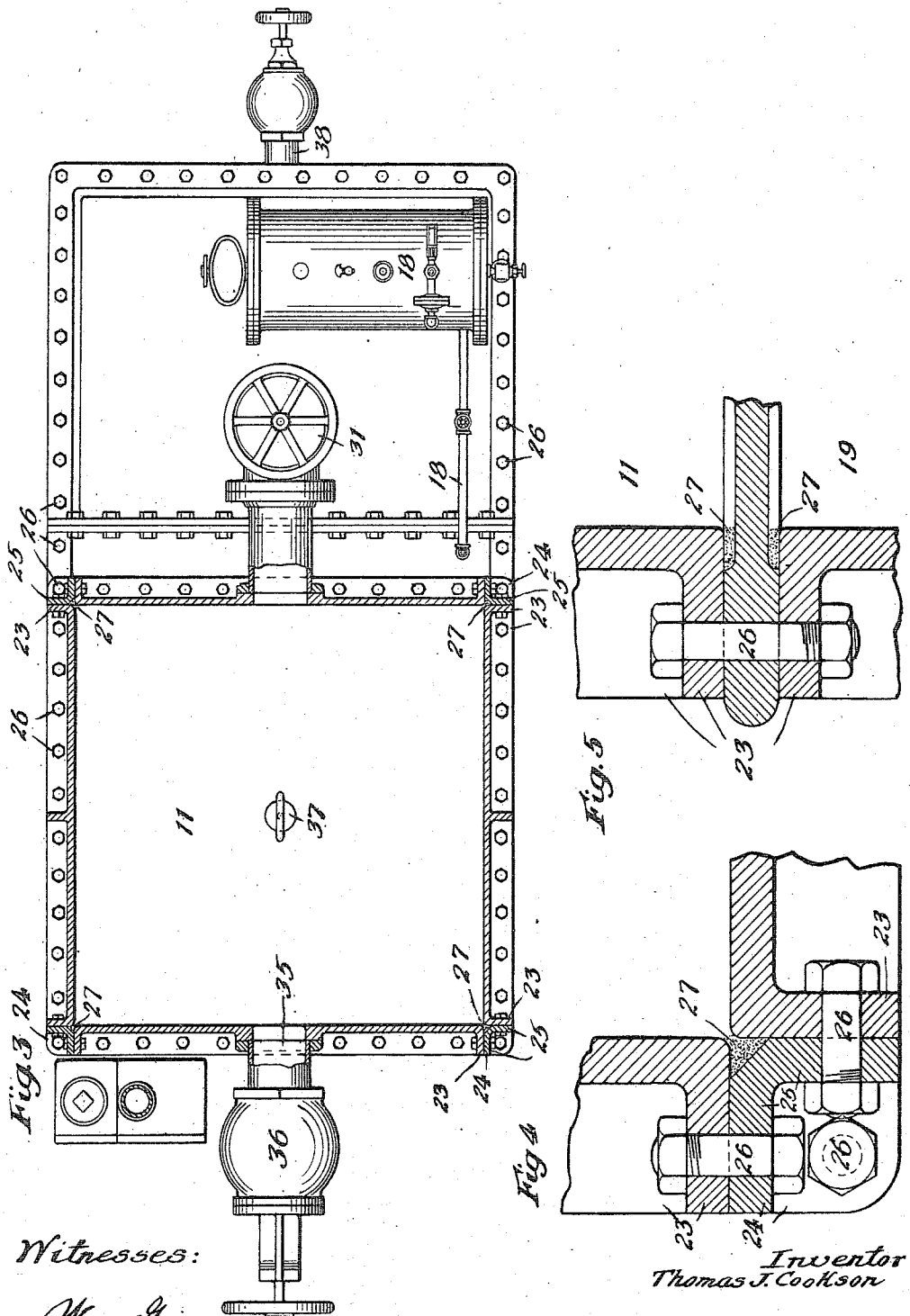

UNITED STATES PATENT OFFICE.

THOMAS J. COOKSON, OF CINCINNATI, OHIO.

FEED-WATER HEATER AND PURIFIER.

972,824.   Specification of Letters Patent.   Patented Oct. 18, 1910.

Application filed December 19, 1908. Serial No. 468,309.

*To all whom it may concern:*

Be it known that I, THOMAS J. COOKSON, a citizen of the United States, residing in Cincinnati, in the county of Hamilton and State of Ohio, have invented new and useful Improvements in Feed-Water Heaters and Purifiers, of which the following is a specification.

This invention relates to certain improvements in feed-water heaters for steam boilers.

The chief object of the invention is to provide a convenient and effective means for cleaning the filtration chamber, which is the part that requires cleaning most frequently, without stopping the flow of the feed-water to the boiler.

This object is accomplished by the construction and arrangement and combination of the heating and filtration chambers and the pipes and valves in connection therewith, as hereinafter fully set forth and made the subject of the claims.

In the accompanying drawings, which form a part of this specification, Figure 1 is an end elevation of the improved feed-water heater and purifier; Fig. 2 is a vertical longitudinal sectional view of the same; Fig. 3 is a sectional plan of the same; Fig. 4 is a section of one of the corner joints of the structure, and Fig. 5 is a sectional view of one of the intermediate joints of the structure, the last two figures named being drawn upon a larger scale than the previous ones.

In said drawing 11 is the heating chamber that receives the feed-water to be heated as well as the exhaust steam and whatever chemical admixture is necessary for the purification of the water or the precipitation of its impurities: 12 is the inlet for the exhaust steam into chamber 11, and 13 the outlet for the uncondensed exhaust: 14 is the inlet for the feed-water supply, delivered at first into the overflow or mixing box 15, whence it overflows to the baffle-plate system 16, and is thus brought into intimate contact with the heating steam of the exhaust. At the mixing box or overflow the necessary chemical admixture is made by means of the chemical delivery pipe 17 communicating with the chemical feed supply and feeding apparatus 18.

The filtering chamber is shown at 19, the perforated floor being indicated at 20, and the filtering medium at 21, below which is the collection portion 22 of said chamber. The filtering chamber in its dimensions is made much larger than that of the heating chamber that there may be better opportunity for settling and filtration of the water.

Both the heating and the filtering chambers are made rectangular in form, of plates joined together at the corners, each of the plates being cast with the projections, attachments and apertures required to form, when put together, the structure desired. The method of joining the several plates to constitute the complete apparatus is clearly indicated in the drawings and especially at Figs. 4 and 5 thereof. At each side of each one of the plates—excepting the cover plates for the heating chamber and for the filtering chamber—is an angle flange 23; and to form the corner a separate piece 24 having angle flanges 25, 25, is employed. Bolts 26 are set through the flanges as indicated. The cover of the filtering chamber and which constitutes a partition between the two chambers is secured as indicated in Figs. 2 and 5. To produce a tight joint at these several joinings a suitable cavity is formed and the same calked with a calking 27.

In the heating chamber at one side is the overflow trough 28, leading to the overflow pipe 29. The upper lip of this trough is what determines the limit of height to which the water in the said heating chamber may rise. The normal outlet for the water from the heating chamber is the outlet pipe 30, provided with the cut off valve 31. This pipe delivers the water into the filtering chamber. From the collecting portion of the filtering chamber the pipe 32 debouches leading to the delivery pipe 33 which latter takes the water to the boiler. Between the pipe 32 and the pipe 33 is a cut-off valve 34. From the heating chamber a pipe 35, similar to the pipe 32 is led to the delivery pipe 33, and said pipe 35 is also provided with a cut-off valve 36. The purpose of these pipes and valves will presently be explained. In the bottom of the heating chamber is shown a small removable screw drain plug 37 for use in cleaning. 38, 39 are water pipes entering the filtering chamber.

When it is desired to clean the filter, without stopping the action of the heater or the delivery of the feed-water, the valves 31 and 34 are closed and the valve 36 opened. This cuts off the feed water from the filter to the delivery pipe and opens communication from the heating chamber to the said delivery pipe by way of the pipe 35. The filtering chamber is now entirely cut off from the feed water though the boilers are still being supplied. And while in this condition the filtering chamber and its collecting portion may be drained by the pipes 38, 39 and washed or otherwise cleaned and new filtering medium substituted for the old and used up medium. In the meantime the boilers are being supplied with the heated water which has also been purified so far as the chemical additions and the baffle-plate action can purify it, leaving out only the bare filtering action of the temporarily suspended filter. While the employment of the filter is of course desirable its temporary suspension while cleaning is not a serious matter; much less serious than the damage likely to occur if the filter be not cleaned and the action of the whole apparatus thus interfered with. And, since the filter is the part of the apparatus that gets foul most quickly, the arrangement and construction which easily permits its cleansing, without stopping the action of the heating and chemicalizing chamber and the delivery of the water therefrom to the boiler, is a valuable improvement, and is one highly appreciated by the users.

I claim:—

1. The combined feed-water heater and purifier, comprising in combination the heating chamber, the filtering chamber adjoining and below the heating chamber, the collection chamber adjoining and below the filtering chamber, a pipe connecting the heating chamber with the filtering chamber, a cut-off valve in said pipe, a delivery pipe, a pipe connecting the heating chamber with the delivery pipe, a cut-off valve in the last mentioned connecting pipe, a pipe connecting the collection chamber with the said delivery pipe, a cut-off valve in the last mentioned pipe arranged to separate the collection chamber from both the heating chamber and the delivery pipe, and an independent pipe and cut-off valve connecting the filtering chamber at will directly with the collection chamber, whereby the heated water may be supplied from the heating chamber directly to the delivery pipe, or through the filtering medium, or through the filtering and collection chambers without passing through the filtering medium, substantially as described.

2. The combined feed-water heater and purifier, comprising in combination the heating chamber, the filtering chamber adjoining and below the said heating chamber, the collecting chamber adjoining and below the filtering chamber, a delivery pipe and suitable connecting pipes from said chambers, the said chambers being composed of cast plates, and means for clamping said plates together comprising flanges 23 on the said plates, corner pieces 24 having flanges 25 fitting the flanges 23 and beveled at their inner corners to leave a space, a packing in said space at the inner ends of the flanges 23 and bolts 26, substantially as described.

In testimony whereof, I have hereunto set my hand this third day of December, A. D. 1908.

THOMAS J. COOKSON.

Witnesses:
H. E. HALL,
BERT CLARK.